(12) United States Patent
Berg et al.

(10) Patent No.: US 10,477,369 B2
(45) Date of Patent: Nov. 12, 2019

(54) SYSTEMS AND METHODS FOR UPDATING A MOBILE DEVICE

(71) Applicant: Assa Abloy AB, Stockholm (SE)

(72) Inventors: Daniel Berg, Sundbyberg (SE); Johan Söderström, Stockholm (SE); Magnus Dürr, Huddinge (SE); Adam Skoglund, Uppsala (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/053,103

(22) Filed: Feb. 25, 2016

(65) Prior Publication Data

US 2016/0249159 A1 Aug. 25, 2016

Related U.S. Application Data

(60) Provisional application No. 62/120,754, filed on Feb. 25, 2015.

(51) Int. Cl.
*H04W 4/80* (2018.01)
*H04W 8/00* (2009.01)
(Continued)

(52) U.S. Cl.
CPC .......... *H04W 4/80* (2018.02); *G07C 9/00103* (2013.01); *G07C 9/00904* (2013.01);
(Continued)

(58) Field of Classification Search
CPC ..... H04W 12/06; H04W 4/008; H04W 12/04; H04W 12/08; H04W 48/02; H04W 12/10; H04W 4/001; H04W 4/02; H04W 4/021; H04W 4/043; H04W 76/023; H04W 84/18; H04W 88/06; H04W 88/182; H04W 8/005; H04W 8/20; H04W 8/22; G07C 9/00904; G07C 9/00571; G07C 9/00007; G07C 9/00103; G07C 2009/00793; G07C 9/00031; G07C 9/00111; G07C 9/00309;
(Continued)

(56) References Cited

U.S. PATENT DOCUMENTS 7,706,778 B2 4/2010 Lowe
2006/0068704 A1* 3/2006 Bhakta ................... G06Q 30/02
455/41.2
(Continued)

FOREIGN PATENT DOCUMENTS

EP 2620919 7/2013
WO WO 2014/184678 11/2014

OTHER PUBLICATIONS

Extended Search Report for European Patent Application No. 16157212.8, dated Jul. 14, 2016 8 pages.

*Primary Examiner* — Golam Sorowar
(74) *Attorney, Agent, or Firm* — Schwegman Lundberg & Woessner, P.A.

(57) ABSTRACT

A method and device for delivering one or more keys to an offline mobile communication device are provided. The method includes receiving the one or more keys from a backend issuance system, preparing the one or more keys for delivery to the offline mobile communication device via a short-to-medium communication channel, and transmitting the one or more keys to the offline mobile communication device via the short-to-medium range communication channel.

19 Claims, 6 Drawing Sheets

(51) Int. Cl.
  *G07C 9/00* (2006.01)
  *H04L 29/08* (2006.01)
  *H04L 29/06* (2006.01)
  *H04W 12/04* (2009.01)
  *H04W 12/06* (2009.01)

(52) U.S. Cl.
  CPC ............ *H04L 63/062* (2013.01); *H04L 67/28* (2013.01); *H04W 8/005* (2013.01); *H04W 12/04* (2013.01); *H04W 12/0608* (2019.01)

(58) Field of Classification Search
  CPC ...... G07C 9/00857; G07C 2009/00365; G07C 2009/00412; G07C 2009/00865; G07C 2209/64; G07C 9/00174; G06Q 20/352; G06Q 20/401; G06Q 10/02; G06Q 20/3278; G06Q 20/3552; G06Q 20/3672; G06Q 20/3829; G06Q 20/385; G06Q 20/40; G06Q 30/02; G06Q 30/0601; G06Q 20/08
  See application file for complete search history.

(56) References Cited

U.S. PATENT DOCUMENTS

| | | | |
|---|---|---|---|
| 2008/0077982 | A1 | 3/2008 | Hayler et al. |
| 2009/0066476 | A1 | 3/2009 | Raheman |
| 2011/0187493 | A1* | 8/2011 | Elfstrom ................ G06Q 10/02 340/5.6 |
| 2014/0227976 | A1* | 8/2014 | Callaghan ................. G06F 8/65 455/41.2 |
| 2014/0292482 | A1* | 10/2014 | Robertson ........... G07C 9/00111 340/5.61 |
| 2015/0194000 | A1* | 7/2015 | Schoenfelder ...... G07C 9/00309 340/5.61 |
| 2015/0199863 | A1* | 7/2015 | Scoggins ........... G07C 9/00904 340/5.25 |
| 2015/0228134 | A1* | 8/2015 | Tehranchi ........... G07C 9/00111 340/5.61 |
| 2015/0347729 | A1* | 12/2015 | Eberwine ................ G06F 21/34 726/9 |

\* cited by examiner

SYSTEMS AND METHODS FOR UPDATING A MOBILE DEVICE

CROSS-REFERENCE TO RELATED APPLICATIONS

This application claims the benefit of U.S. Provisional Application No. 62/120,754, filed on Feb. 25, 2015, which application is hereby incorporated herein by reference in its entirety.

FIELD

The present disclosure is generally related to devices for providing access control credentials to mobile devices using short-range or medium-range communication channels rather than the Internet or other network connections.

BACKGROUND

Mobile guest check-in has become increasingly popular, especially with the proliferation of mobile keys. As an example, technologies have been developed that enable hotel guests to utilize their personal mobile communication devices (e.g., smartphones) as their personal credentials. Methods and systems have been developed to enable these guests to have a mobile key transported to the guest's mobile communication device, which then transforms the mobile communication device to a guest key. Among the benefits of these systems, the guest is allowed to bypass the customer service desk when arriving at the hotel and can proceed directly to an assigned room since the appropriate mobile key has already been written to the mobile communication device. Details of these types of systems are described in U.S. Pat. No. 7,706,778 to Lowe and U.S. Pat. No. 8,730,004 to Elfstrom et al., each of which is hereby incorporated herein by reference in its entirety.

SUMMARY

Embodiments of the present disclosure are concerned with the issuance of a mobile key to a mobile device even when the mobile device lacks network connectivity (e.g., a wireless or wired connection to a broader communication network, such as the Internet or a cellular network). Instead of relying on the mobile device's Internet connection utilizing Wi-Fi (e.g., 802.11n) or a phone service provider's data plan, data (e.g., a mobile key) can be sent to the mobile device via a short-to-medium range communication interface from a physical update module, which in turn is connected to the Internet, thereby linking the mobile device to the issuance backend services.

In addition to including a process for connecting the mobile device to the issuance backend services via the short-to-medium range radio communication, embodiments of the present disclosure also include the concept of an updater, which is a new hardware component having a short-to-medium range radio module and/or other short-to-medium range communication interface(s) as well as a Wi-Fi/Cable/Ethernet connection to a broader communication network. These two communication interfaces enable the updater to act as a hub/router for the data traffic between the issuance backend services and the mobile device.

As a non-limiting example, an Internet connected updater/reader may be positioned in the lobby of a hotel so that foreign guests with roaming turned off on their mobile devices can tap the updater/reader to receive their electronic room keys over a Bluetooth Low Energy (BLE) and/or Near-Field Communications (NFC) interface. A mobile access application running on the mobile device then connects over BLE/NFC to the updater, which continues to communicate with the mobile device over BLE/NFC while also communicating with a trusted backend service over TCP/IP or the like. In response to an authorized request, the trusted backend service sends an electronic key to the updater via TCP/IP, and the updater provides the electronic key to the mobile device over BLE/NFC. In embodiments, the electronic key is stored in a Secure Element (SE) or an otherwise secured storage area of the mobile device.

In embodiments, the mobile access application running on the mobile device is configured to utilize an Internet or other network connection when such a connection is available, and is configured to utilize a short- to medium-range, direct communication interface to obtain electronic keys when the Internet or other network connection is not available (e.g. because roaming is disabled on the mobile device, or because the mobile device is in airplane mode). The mobile access application may be configured to initiate communications over a short- to medium-range communication interface whenever an Internet or other network connection is not available, or it may be configured to initiate such communications in response to being tapped, e.g., being tapped on an updater. In other words, in the application, this synchronization is just like when the user clicks normally reload and the application connects to the trusted backend service over the mobile network, but the user behavior will be like tapping a reader to unlock to open the alternative update channel. At the low level, the updater will broadcast another service ID than normal readers.

A method for delivering a key to a mobile device in accordance with one embodiment of the disclosure includes establishing a proximity-based communication channel with a mobile device; receiving an update request from the mobile device via the proximity-based communication channel; providing the update request to a key issuance backend on behalf of the mobile device, wherein the update request is provided to the key issuance backend by an updater having a network interface that enables communications with the key issuance backend; receiving one or more keys from the key issuance backend in response to the update request; and transmitting the one or more keys from the updater to the mobile device via the proximity-based communication channel.

In some of the above embodiments, the method further includes notifying an operator, via a user interface of the mobile device, that the one or more keys have been received at the mobile device via the proximity-based communication channel. In additional embodiments, the proximity-based communication channel includes at least one of a BLE, peer-to-peer WiFi, and NFC communication channel. Also in some embodiments, the mobile device includes a network interface that is at least one of limited in functionality and disabled thereby preventing the mobile device from directly transmitting the update request to the key issuance backend. In further embodiments, the update request includes at least one identifier of the mobile device. In still further embodiments, the one or more keys correspond to keys pre-issued by an operator or generated in response to check-in in response to a user of the mobile device remotely checking-in at a multi-room facility.

An updater device in accordance with some embodiments of the present disclosure includes a network interface that facilitates communications with a key issuance backed via a communication network; a device interface that facilitates establishment of a proximity-based communication channel with a mobile device in response to the mobile device being brought within a predetermined distance of the updater device; a processor; and memory including instructions that, when executed by the processor, enable the updater device to transmit an update request to the key issuance backend on behalf of a mobile device and then provide one or more keys or updates to keys to the mobile device via the proximity-based communication channel.

In some of these embodiments, the one or more keys are received at the updater from the key issuance backend via the network interface. Also in some embodiments, the network interface facilitates TCP/IP communications. In further embodiments, the proximity-based communication channel includes at least one of a BLE, peer-to-peer WiFi, and NFC channel. In still further embodiments, the one or more keys are encrypted when received at the network interface and never exposed by the updater device. In additional embodiments, the network communication is limited to approved key issuing backends or postboxes so that the device cannot be utilized for general Internet connectivity. In embodiments, the device interface is one of a plurality of device interfaces, each of the plurality of device interfaces being configured to establish a proximity-based communication channel based on a communication protocol not used by any other of the plurality of device interfaces.

A method of providing a key update to a mobile device according to the present disclosure includes receiving, via a network interface of a key issuance device, a key update request originated by a mobile device and forwarded by an updater to the key issuance device over a communication network; verifying that the mobile device is authorized to receive a key update; generating, at a processor of the key issuance device, a key update based on key parameter information; and sending to the updater, via the network interface, a key update for the mobile device.

In embodiments, the above method further includes receiving from the updater via the network interface a message confirming that the key update was provided by the updater to the mobile device. The method further includes, in some embodiments, reporting successful transmission of the key update to the mobile device to an operator of the key issuance device. Also in some embodiments, the method further includes sending the key update from the key issuance device to a key vault that is physically separate from the key issuance device via a communication interface other than the network interface; and receiving the key update from the key vault via the communication interface in response to a key update retrieval request sent by the processor of the key issuance device to a processor of the key vault. In further embodiments, the processor of the key vault retrieves the key update from a secure data storage of the key vault and transmits the key update to the key issuance device.

In some of the aforementioned embodiments, the key parameter information includes one or more of a guest name, an assigned room, a length of stay, and a loyalty status. Also in some of the embodiments, the key parameter information is received at the processor of the key issuance device from a user interface of the key issuance device or from the communication network.

Additional details regarding these and other embodiments of the present disclosure are provided in the detailed description below.

BRIEF DESCRIPTION OF THE DRAWINGS

In the drawings, like reference characters generally refer to like figures and structural elements throughout the various figures. The following drawings are illustrative of embodiments of the invention and are not meant to limit the scope of the invention as encompassed by the claims. The foregoing features of this invention, as well as the invention itself, may be more fully understood from the following description of the drawings, in which:

DETAILED DESCRIPTION

Figure 1:
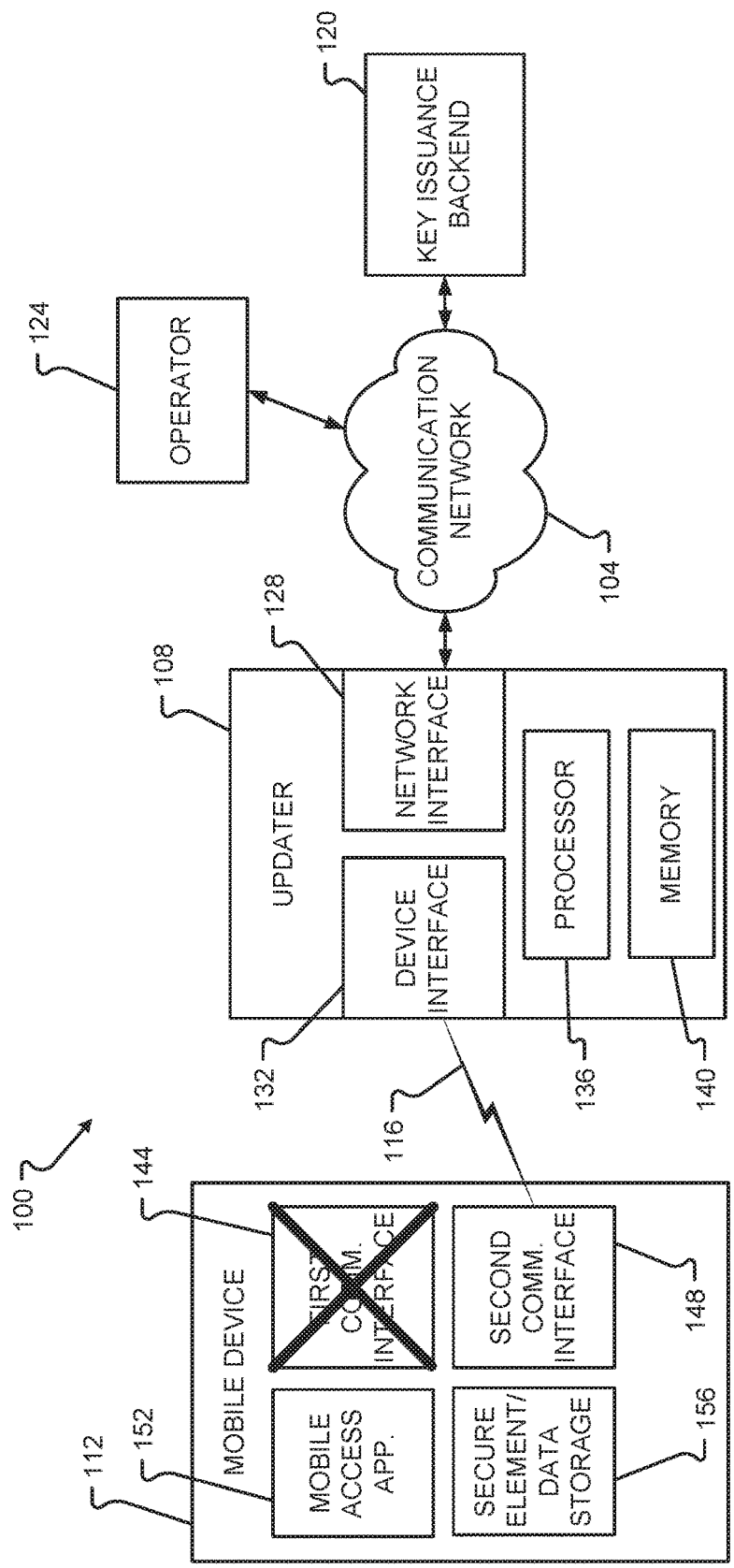
FIG. 1 is a block diagram of a system according to an embodiment of the present disclosure.

With reference now to FIG. 1, an illustrative system 100 for updating a mobile device with one or more keys will be described in accordance with at least some embodiments of the present disclosure. The system 100 is shown to include a communication network 104, an updater 108, a mobile device 112, a key issuance backend 120, and an operator 124. It should be appreciated that the operator 124 and key issuance backend 120 may be provided as a common component, although such a configuration is not required. In some embodiments, the operator 124 and/or key issuance backend 120 are owned and/or operated by a hospitality management entity. In particular, the operator 124 may generate keys for use in a multi-room facility (e.g., hotel, cruise ship, dorm, motel, etc.) and the key issuance backend 120 may be used to distribute the keys generated by the operator 124 to various mobile devices 112 and credentials (e.g., purpose-built cards and/or key fobs).

The communication network 104 may include any type of communication medium or collection of communication equipment that enables remote communication devices to exchange information and/or media with one another using any type of known or yet-to-be developed transport protocol. The communication network 104 may facilitate wired and/or wireless communication technologies. The Internet is an example of a communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network (e.g., 3G, 4G, LTE, etc.), and any other type of packet-switched or circuit-switched network known in the art. In addition, it can be appreciated that the communication network 104 need not be limited to any one network type, and instead may include a number of different networks and/or network types. Moreover, the communication network 104 may include a number of different communication media such as coaxial cable, copper cable/wire, fiber-optic cable, antennas for transmitting/ receiving wireless messages, and combinations thereof. As noted, one example of the communication network 104 is the Internet.

The mobile device 112 may correspond to one or multiple devices that are carried by a user and/or guest of the multi-room facility being managed by the operator 124. The mobile device 112 may correspond to a movable device capable of being operated by a user or multiple users. When fully functional, the mobile device 112 may be capable of communicating directly with the key issuance backend 120 via the communication network 104 using any of the protocols supported by the communication network 104. In some embodiments, a first communication interface 144 of the mobile device 112 may be used to connect the mobile device 112 directly to the communication network 104, thereby enabling a somewhat direct exchange of keys between the key issuance backend 120 and mobile device 112.

However, there may be instances where the first communication interface 144 is disabled or otherwise prohibited from connecting to the communication network 104. For instance, when the mobile device 112 is administered by its user to avoid roaming (e.g., due to international travel), the first communication interface 144 may be limited or completely disabled to avoid roaming and any charges incurred in connection therewith. In such a scenario, the mobile communication device 112 may rely upon a second communication interface 148 to facilitate direct communications with nearby devices via a proximity-based communication channel 116. As will be discussed in further detail herein, the second communication interface 148 may be utilized by the mobile device 112 to receive keys from the key issuance backend 120 even though the first communication interface 144 is disabled or limited in its capabilities.

In some embodiments, the communication channel 116 may correspond to a BLE communication channel. In some embodiments, the communication channel 116 may correspond to an NFC communication channel. In some embodiments, the communication channel 116 may correspond to an Infrared communication channel. In some embodiments, the communication channel 116 may correspond to an Ultrasonic communication channel. Any other type of communication protocol that is dependent upon proximity and/or line-of-sight may be utilized between the mobile device 112 and updater 108. Other protocols may also be used to exchange information between the mobile device 112 and the updater 108. For instance, the updater 108 may include a barcode or Quick Response (QR) code dynamically displayed on a screen thereof, or affixed by a sticker or the like to a surface of the updater 108. The mobile device 112 may obtain information from the updater 108 by taking one or more images of the updater's 108 screen or sticker and decoding the barcode and/or QR code. Another type of communication channel 116 that may be used without departing from the scope of the present disclosure is a peer-to-peer Wi-Fi connection. When possible (e.g., when BLE or NFC is used as the channel 116), no manual pairing process is needed, thereby making it possible to simply tap the updater 108 with the mobile device 112 to establish the communication channel 116. It should be appreciated, however, that access to the communication channel 116 (and more specifically the device interface 132 of the updater 108) may be restricted to mobile devices 112 having a valid mobile access application 152 stored thereon. A mobile device 112 without the mobile access application 152 may not be allowed to establish a communication channel 116 with the device interface 132. Thus, the mobile access application 152 may be used to perform an automated mutual authentication with the updater 108 before establishing the communication channel 116 or as part of establishing the communication channel 116.

As will be discussed in further detail herein, it may not be possible for the mobile device 112 to utilize the communication channel 116 to access the communication network 104 for broader purposes (e.g., to access other Internet resources). Instead, the communication channel 116 may be utilized solely for synchronizing one or more mobile keys with corresponding keys stored in a mobile key vault at the key issuance backend 120 and potentially for other adjacent, restricted services like checking-in by tapping the updater 108 or the like. In other words, the mobile device 112 may be restricted in some embodiments from using the communication channel 116 for anything other than receiving a key from the updater 108 and/or performing other check-in functions with the operator 124. The restrictions on this functionality may be enforced by a processor 136 of the updater 108 or by some other firewall residing on the network interface 128 of the updater 108 or between the updater 108 and the communication network 104.

With specific regard to the mobile device 112, although not shown, the mobile device 112 may include computer memory that stores one or more Operating Systems (O/S) and the mobile access application 152, among other items. The mobile device 112 may also include a processor, one or more drivers, a user interface, and a power module (not shown). The mobile device 112 may further include a first communication interface 144 (e.g., a network interface) and a second communication interface 148 (e.g., a credential interface) as well as a secure element 156 for storing the one or more keys received from the key issuance backend 120. Suitable examples of a mobile device 112 include, without limitation, smart phones, PDAs, laptops, PCs, tablets, net books, smart watches, other wearables, and the like.

The memory (not shown) may correspond to any type of non-transitory computer-readable medium. In some embodiments, the memory may include volatile or non-volatile memory and a controller for the same. Non-limiting examples of memory that may be utilized in the mobile device 112 include RAM, ROM, buffer memory, flash memory, solid-state memory, or variants thereof.

The mobile access application 152 may be an application stored in memory that, when executed by the processor, retrieves mobile keys from the key issuance backend 120 through the issuance of a key update request, causes the mobile keys to be stored in the secure element/data storage 156 or in a secured area in the mobile access app 152, and enables the utilization of such mobile keys to access various readers in the secure access system, which may correspond to a physical access control system of a multi-room facility.

The processor (not shown) may correspond to one or many microprocessors that are contained within the housing of the mobile device 112 with the memory. In some embodiments, the processor incorporates the functions of the mobile device's 112 Central Processing Unit (CPU) on a single Integrated Circuit (IC) or a few IC chips. As with other processors disclosed herein, the processor may be a multipurpose, programmable device that accepts digital data as input, processes the digital data according to instructions stored in its internal memory, and provides results as output. The processor may implement sequential digital logic as it has internal memory. As with most known microprocessors, the processor may operate on numbers and symbols represented in the binary numeral system.

The driver(s) (not shown) may correspond to hardware, software, and/or controllers that provide specific instructions to hardware components of the mobile device 112, thereby facilitating their operation. For instance, interfaces 144, 148, may each have a dedicated driver that provides appropriate control signals to effect their operation. The driver(s) may also include the software or logic circuits that ensure the various hardware components are controlled appropriately and in accordance with desired protocols. For instance, the driver of the second communication interface 148 may be adapted to ensure that the second communication interface 148 follows the appropriate proximity-based protocols (e.g., BLE, NFC, Infrared, Ultrasonic, peer-to-peer Wi-Fi, etc.) such that the second communication interface 148 can exchange communications with the updater 108. Likewise, the driver of the first communication interface 144 may be adapted to ensure that the first communication interface 144 follows the appropriate network communication protocols (e.g., TCP/IP (at one or more layers in the OSI model), UDP, RTP, GSM, LTE, Wi-Fi, etc.) such that the interface 144 can exchange communications via the communication network 104. As can be appreciated, the driver(s) may also be configured to control wired hardware components (e.g., a USB driver, an Ethernet driver, etc.).

The second communication interface 148 may correspond to the hardware that facilitates communications via the communication channel 116. The second communication interface 148 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, second communication interface 148 is specifically provided to facilitate proximity-based communications with an updater 108 via communication channel 116 or multiple communication channels 116.

The first communication interface 144 may include hardware that facilitates communications with other communication devices over the communication network 104. As mentioned above, the first communication interface 144 may include an Ethernet port, a Wi-Fi card, a Network Interface Card (NIC), a cellular interface (e.g., antenna, filters, and associated circuitry), or the like. The first communication interface 144 may be configured to facilitate a connection between the mobile device 112 and the communication network 104 and may further be configured to encode and decode communications (e.g., packets) according to a protocol utilized by the communication network 104.

The optional secure element/data storage 156 may correspond to one or multiple secure memory devices that are capable of storing data in an encrypted and secure manner. Communications between the secure element 156 and the interfaces 144, 148 may also be secured, thereby ensuring that data received at the mobile device 112 is securely stored in the secure element 156 without exposure. The secure element 156 may be integrated into the mobile device 112 or it may be removable in nature. Suitable examples of secure elements 156 include, without limitation, a Universal Integrated Circuit Card (UICC), an embedded SE, and microSD.

The power module (not depicted) may include a built-in power supply (e.g., battery) and/or a power converter that facilitates the conversion of externally-supplied AC power into DC power that is used to power the various components of the mobile device 112. In some embodiments, the power module may also include some implementation of surge protection circuitry to protect the components of the mobile device 112 from power surges.

The updater 108 may correspond to a purpose-built reader/writer or similar type of device. In some embodiments, the updater 108 includes a device interface 132 and a network interface 128. The updater 108 may provide a go-between for the mobile device 112 and key issuance backend 120 when the mobile device 112 has its first communication interface 144 disabled or limited in functionality.

The updater 108 may further include a processor 136 and memory 140. The processor 136 may be similar or identical to the processor described in connection with the mobile device 112. For instance, the processor 136 may correspond to a microprocessor or the like. Similarly, the memory 140 may correspond to any type of computer memory. The memory 140 may include computer-executable instructions that, when executed by the processor 136, enable certain functions of the updater 108 to be performed. For instance, the memory 140 may include instructions that enable the updater 108 to retrieve one or more keys from the key issuance backend 120 on behalf of the mobile device 112. The memory 140 may also include instructions that enable the updater 108 to write/provide the keys to the mobile device 112 via the communication channel 116. In some embodiments, the updater 108 may also report to the key issuance backend 120 that the user of the mobile device 112 is physically at the hotel and has received the key. Thus, if a user taps the updater 108 after using a key, the key may include additional data, including but not limited to access logs or battery alarms from the locks visited by the mobile device 112. This data may be delivered from the mobile device 112 to the updater 108, which may subsequently provide the data (e.g., access logs, battery alarms, etc.) back to the key issuance backend 120 and/or operator 124 via the communication network 104.

Figure 2:
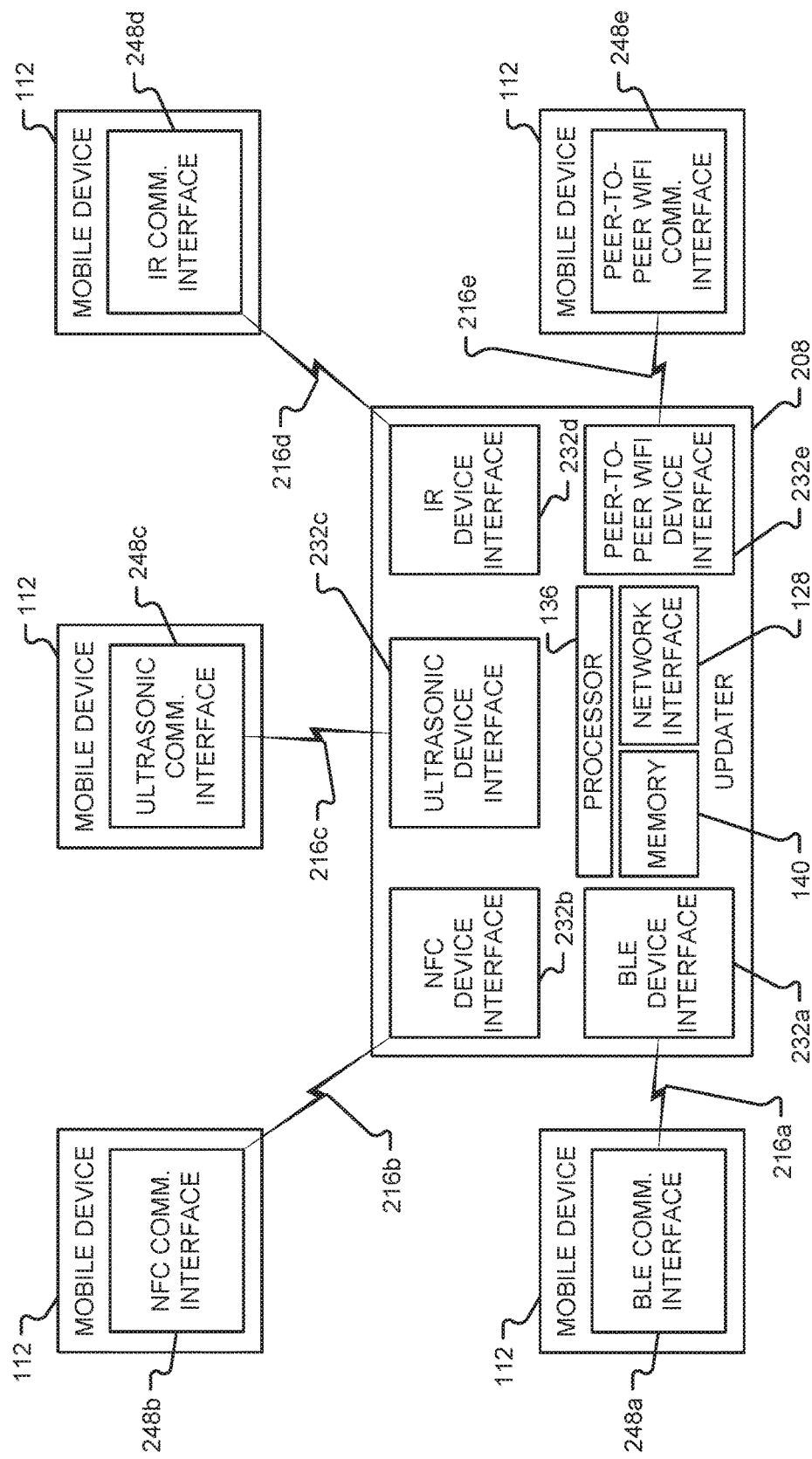
FIG. 2 is a block diagram of aspects of a system according to an embodiment of the present disclosure.

An updater 208 according to some embodiments of the present disclosure is depicted in FIG. 2. The updater 208 includes a memory 140 storing instructions for execution by the processor 136. Such instructions, when executed by the processor, enable the processor to carry out needed functions, including, for example, receipt and/or analysis of a key update request from a mobile device 112; translation of a key update request from one format to another (e.g. from a format in which the request is received from a mobile device 112 to a format that can be transmitted to and understood by a key issuance backend 120); transmission of a key update request to a key issuance backend 120; receipt of a key update from a key issuance backend 120; translation of a key update from one format to another (e.g. from a format in which the key update is received from a key issuance backend 120 to a format that can be transmitted to and used by a mobile device 112); and transmission of a key update to a mobile device 112.

The updater 208 of FIG. 2 also includes one or more device interfaces for communicating with mobile devices 112. To increase the number of mobile devices 112 with which the updater 208 can communicate, the updater 208 may include, for example, a BLE device interface 232a, an NFC device interface 232b, an ultrasonic device interface 232c, an infrared device interface 232d, and a peer-to-peer WiFi device interface 232e. Thus, as long as a mobile device 112 has a communication interface 248 compatible with at least one of the communication interfaces 232a-e of the updater 208, the mobile device 112 will be able to communicate with the updater 208. The updater 208 also includes a network interface 128 for communicating with a key issuance backend 120 via a communication network 104 such as the Internet.

As depicted in FIG. 2, a mobile device 112 including a BLE communication interface 248a may establish a BLE communication channel 216a with the BLE device interface 232a of the updater 208. The mobile device 112 can then transmit a key update request to the updater 128 via the communication channel 216a and receive a key update from the updater 208 via the same communication channel 216a. Likewise, a mobile device 112 including an NFC communication interface 248b may establish an NFC communication channel 216b with the NFC device interface 232b of the updater 208; a mobile device 112 including an ultrasonic communication interface 248c may establish an ultrasonic communication channel 216c with the ultrasonic device interface 232c of the updater 208; a mobile device 112 including an infrared communication interface 248d may establish an infrared communication channel 216d with the infrared device interface 232d of the updater 208; and a mobile device 112 including a peer-to-peer WiFi communication interface 248e may establish a peer-to-peer WiFi communication channel 216e with the peer-to-peer WiFi device interface 232e of the updater 208. In embodiments, the updater 208 is capable of communicating with a plurality of mobile devices 112 simultaneously (e.g. over multiple device interfaces 232), while in other embodiments the updater 208 is capable of communicating over only one device interface 232 at a given time. In embodiments, the updater 208 is configured to initiate communications with a mobile device 112 after it is tapped by the mobile device 112, while in other embodiments the updater 208 is configured to initiate communications with any mobile device 112 in response to a signal from the mobile device 112. In still other embodiments, the updater 208 is configured to scan for mobile devices 112 and to initiate communications (or at least attempt to initiate communications) with any mobile device 112 within communication range.

Once the updater 208 receives a key update request from a mobile device 112, the processor 136 of the updater 208 may be configured to initiate a challenge sequence with the mobile device 112 to verify the authenticity of the mobile device 112 and to ensure that the mobile device 112 is authorized to receive a key update. In embodiments, the key update request—which is generated, for example, by a mobile access application 152 running on the mobile device 112—contains the information needed by the updater 208 to verify the authenticity of the mobile device 112 and to ensure that the mobile device 112 is authorized to receive a key update. In still other embodiments, the processor 136 of the updater 208 is not configured to verify authenticity and/or authorization with respect to the mobile device 112, but is instead configured to pass the key update request from the mobile device 112 to the key issuance backend 120 via network interface 128 and the communication network 104. The processor 136 may need (and be configured) to translate the key update request from a first format corresponding to the communication protocol used for communications with the mobile device 112 to a second format corresponding to the communication protocol used for communications with the key issuance backend 120.

Figure 3:
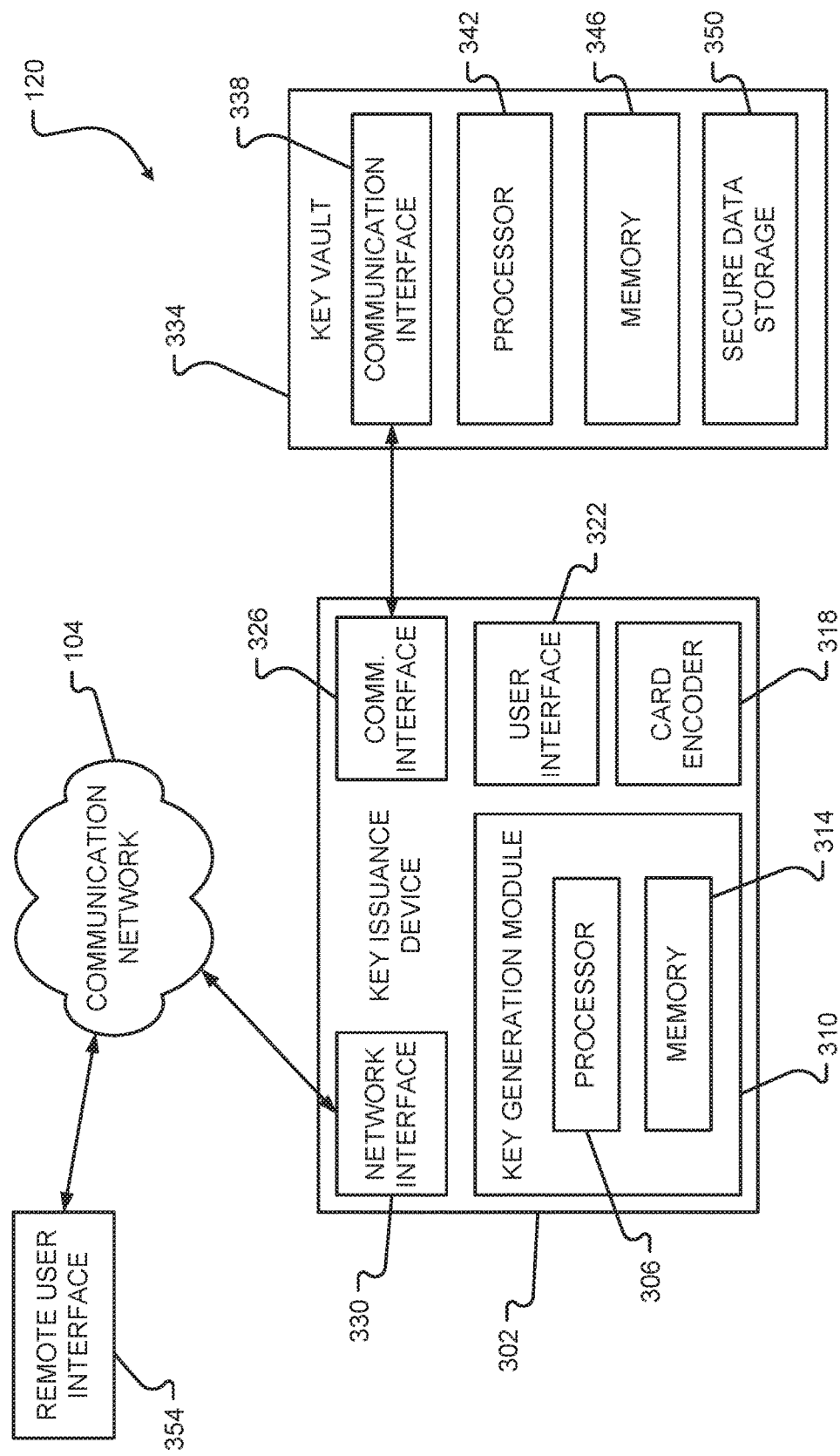
FIG. 3 is a block diagram of aspects of a system according to an embodiment of the present disclosure.

Referring now to FIG. 3, in some embodiments, the key issuance device and the vault where the credential updates are waiting can be separate. In particular, the key issuance backend 120 may be separated into two distinct components: a key issuance device 302 and a key vault 334. Credential updates may be generated by the key issuance device 302 in real time (e.g. upon receipt of a request from a mobile device or from an updater through the communication network 104), or may be created and then stored in the key vault 334 until needed. Although the key issuance device 302 and the key vault 334 are depicted as separate devices in FIG. 3, embodiments of the present disclosure utilize a single device that performs key issuance and key vault functions.

As depicted in FIG. 3, a key issuance device 302 according to embodiments of the present disclosure includes a key generation module 310 that includes a processor 306 and a memory 314. The memory 314 stores instructions that, when executed by the processor 306, cause the processor to create a mobile key (also referred to herein as a key or an electronic key) that can be provided, for example, to a mobile device 112 of, for example, a guest at a multi-room facility. Once stored on the mobile device 112, the key can be presented by the mobile device 112 to an access control device (e.g. a reader controlling a door lock on a room of a multi-room facility) to gain access. The newly generated key may be provided to a mobile device 112 immediately, or may be temporarily stored in the memory 314, or may be transmitted to the secure data storage 350 of the key vault 334 for more secure storage.

In embodiments, the instructions stored in the memory 314 also cause the processor to utilize key parameter information received from the user interface 322, the remote user interface 354, or the communication network 104 via the network interface 330 to configure certain parameters associated with each newly generated key. For example, when key issuance backend 120 is operated by a hotel, a hotel employee using a user interface 322 or a remote user interface 354 may input information such as guest name, assigned room, length of stay, loyalty program status, and so forth. The processor 306 may then encode some or all of this information in the key, so that, for example, the key only works for the assigned room (and, if applicable, for after-hours hotel access, fitness room access, concierge lounge access, and so forth) during the length of stay. In embodiments, this information is provided by a guest when making an online reservation, and is stored in the memory 314 or elsewhere (e.g. in the cloud, or in a local server) until the key generation module is ready to generate a key for that particular guest, at which time the processor obtains the information and uses it to generate a properly-configured key. Thus, information needed by the key generation module 302 to generate a properly configured key may be provided with or without the involvement of a hotel employee or other operator of the key issuance backend 120.

The key issuance device 302 may also include, in some embodiments, a dedicated communication interface 326 for transmitting and receiving electronic keys to and from the key vault 334. Inclusion of a communication interface 326 separate from a network interface 330 may beneficially enhance the security of the key vault 334 by ensuring that any communications to or from the key vault 334 must pass through the communication interface 326, which in turn is not in communication with the communication network 104 or any other outside network or entity. Although the communication interface 326 is depicted separately from the network interface 330 of the key issuance device 302, however, a key issuance device 302 may in some embodiments have only one network/communications interface that handles communications between the key issuance device 302 and the communication network 104, and between the key issuance device 302 and the key vault 334.

The key issuance device 302 may also include, in some embodiments, a card encoder 318. The card encoder 318 may be used by an operator of the key issuance backend 120 to encode a smart card, magnetic strip card, chip card, or other credential with an electronic key generated by the key generation module 310. Such a card or credential may then be given to a guest or other individual needing access to one or more access-controlled rooms or areas, and may be used instead of a mobile device to gain access.

The key vault 334 of FIG. 3 includes, in some embodiments, a communication interface 338 for receiving and transmitting keys from and to the key issuance device 302; a processor 342 for handling key storage and retrieval requests and for providing or enhancing security for the secure data storage 350; a memory 346 for storing instructions to be executed by the processor; and a secure data storage 350 for storing keys generated by the key issuance device 302. When newly generated keys are not immediately provided to a user's mobile device and are not immediately encoded on a card, the keys may instead be transmitted by the key issuance device 302 to the key vault 334 for storage in the secure data storage 350. Use of a key vault 334 having a secure data storage 350 advantageously reduces the likelihood of electronic key theft. Various systems and methods for providing secure data storage are known to persons of ordinary skill in the art, and any such systems and methods may be used for secure data storage 350 in key vault 334.

In embodiments, the local hotel security system (e.g. the a issuance backend 120) generates a payload that will open a specific room for a specific time period. That data is then wrapped in a secure package by a mobile key delivery system (e.g. a key issuance device 302) and put in a vault (e.g. a key vault 334) pending to be fetched by the appropriate mobile device 112 which can read the data.

Figure 4:
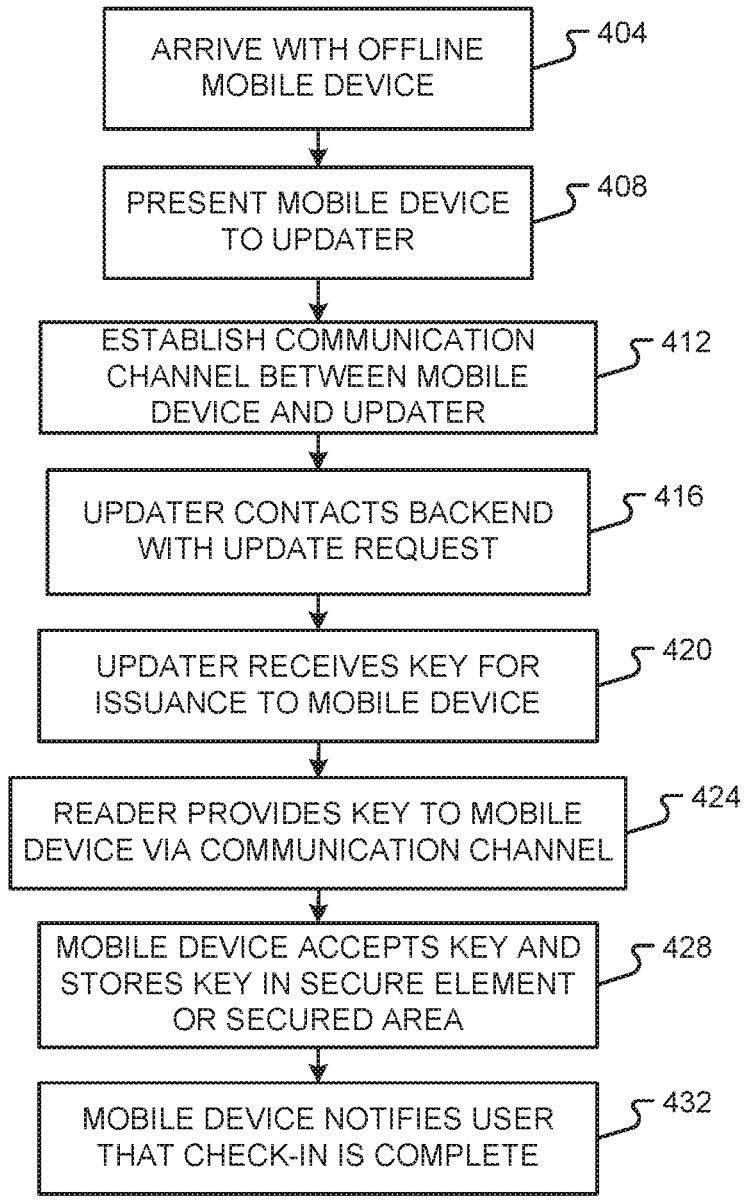
FIG. 4 is a flow diagram of a method according to an embodiment of the present disclosure.

With reference now to FIG. 4, an illustrative method of delivering one or more key updates to a mobile device 112 having its first communication interface 144 disabled or limited will be described in accordance with at least some embodiments of the present disclosure. It should also be appreciated that the disclosed method may include key updates being delivered to a mobile device 112. Key updates being delivered to a mobile device 112 via the updater 108 may include one or more whole keys, partial keys, privilege updates (e.g. extension of the length of time during which an issued key may be used, or a change to the rooms or areas that may be accessed by an issued key), key revocations, and similar system updates. The method begins when a mobile device 112 arrives in the presence of an updater 108 with its first communication interface 144 disabled (step 404). In one example, the mobile device 112 may be configured to avoid roaming. In another example, the mobile device 112 may be in an airplane mode where its cellular communications are disabled.

The method continues when the mobile device 112 is presented to the updater 108 (step 408). In some embodiments, the mobile device 112 is tapped or otherwise brought within a predetermined distance (e.g., less than 2 meters) of the updater 108. In some embodiments, the mobile device 112 is brought within a suitable distance of the updater 108 so as to enable the establishment of the communication channel 116 (step 412). As can be appreciated, the predetermined distance may depend upon the nature of the communication channel 116. If NFC is utilized, the predetermined distance may be less than 0.5 m whereas the predetermined distance maybe between 1 m and 30 m if BLE is utilized. Furthermore, the establishment of the communication channel 116 may be dependent upon a mutual authentication being performed between the mobile device 112 and updater 108. In one embodiment, the mutual authentication is dependent upon the mobile device 112 having a valid and updated mobile access application stored thereon. In some embodiments, the updater 108 only speaks to approved backends. The mobile device 112, in some embodiments, will provide a unique identifier to the updater and if there is a key issued, modified, and/or revoked for that mobile device 112, a data package uniquely encrypted for the specific mobile device 112 is delivered to the mobile device 112 via the updater 108.

Thereafter, the mobile device 112 issues an update request to the updater 108 via the communication channel 116 (step 416). The updater 108 utilizes its network interface 128 to communicate the update request to the key issuance backend 120. The update request may be transmitted from the updater 108 to the key issuance backend 120 in the form of one or more TCP/IP packets transmitted over the Internet. The update request may or may not be encrypted, depending upon security options exerted by the operator 124. The update request may further include information that identifies the mobile device 112 in a unique manner. For instance, the update request may include a MAC address of the mobile device 112. In another example, the vault at the key issuance backend 120 may be personalized and a unique endpointID may be assigned to a particular mobile device 112. EndpointIDs cannot be shared amongst mobile devices 112. As another example, the update request may include an identifier of the mobile access application 152. As another example, the update request may include a random or pseudo-random number generated by the mobile access application 152 that enables the key issuance backend 120 to determine that the update request was received from a valid mobile access application that has enabled a remote check-in with the operator 124. Other ways of validating the update request can include providing one or more of a one-time password from the mobile device 112 to the key issuance backend 120, providing a shared secret from the mobile device 112 to the key issuance backend 120, providing a username and/or password from the mobile device 112 to the key issuance backend 120, or the like. In some embodiments, an encrypted package is downloaded from the key issuance backend 120 to the mobile device 112 and only the correct recipient can decrypt/unwrap the payload delivered from the key issuance backend 120 via the updater 108.

Upon receiving the update request and confirming the validity thereof, the key issuance backend 120 provides the updater 108 with one or more keys that have already been issued by the operator 124 for the mobile device 112 (step 420). The keys may be transmitted from the key issuance backend 120 in an encrypted format. In some embodiments, the updater 108 does not decrypt the keys, but instead simply provides the one or more keys to the mobile device 112 via the same communication channel 116 over which the update request was received (step 424). In some embodiments, the amount of time that passes between steps 408 and 424 is less than 2 seconds, thereby relieving the user/guest of the necessity of holding the mobile device 112 in proximity of the updater 108 for an extended period of time.

The mobile device 112 receives the one or more keys from the updater 108 via the communication channel 116 and causes the keys to be stored in its secure element 156 or some other secured data storage area (step 428). Typically, the data can be stored in an encrypted vault in the mobile access application 152 sandbox (or, in some cases, in a Secure Element as mentioned above). Encryption keys for the vault may or may not be protected in the operating system (0/S) keystore. "Secure" data storage area is however always debatable and relative.

In some cases the whole app runs in a Trusted Execution Environment (TEE). Once the key(s) are stored in the secure element 156 or in an encrypted vault in the mobile access application 152 sandbox, the mobile device 112 may notify the user that the transaction is complete and the mobile device 112 can be removed from proximity of the updater 108 (step 432). The mobile device 112 is then able to utilize the keys received from the updater 108 in any desirable way. For instance, the keys can be used by the mobile access application 152 to access various assets (physical or logical) that are protected by access control readers.

Figure 5:
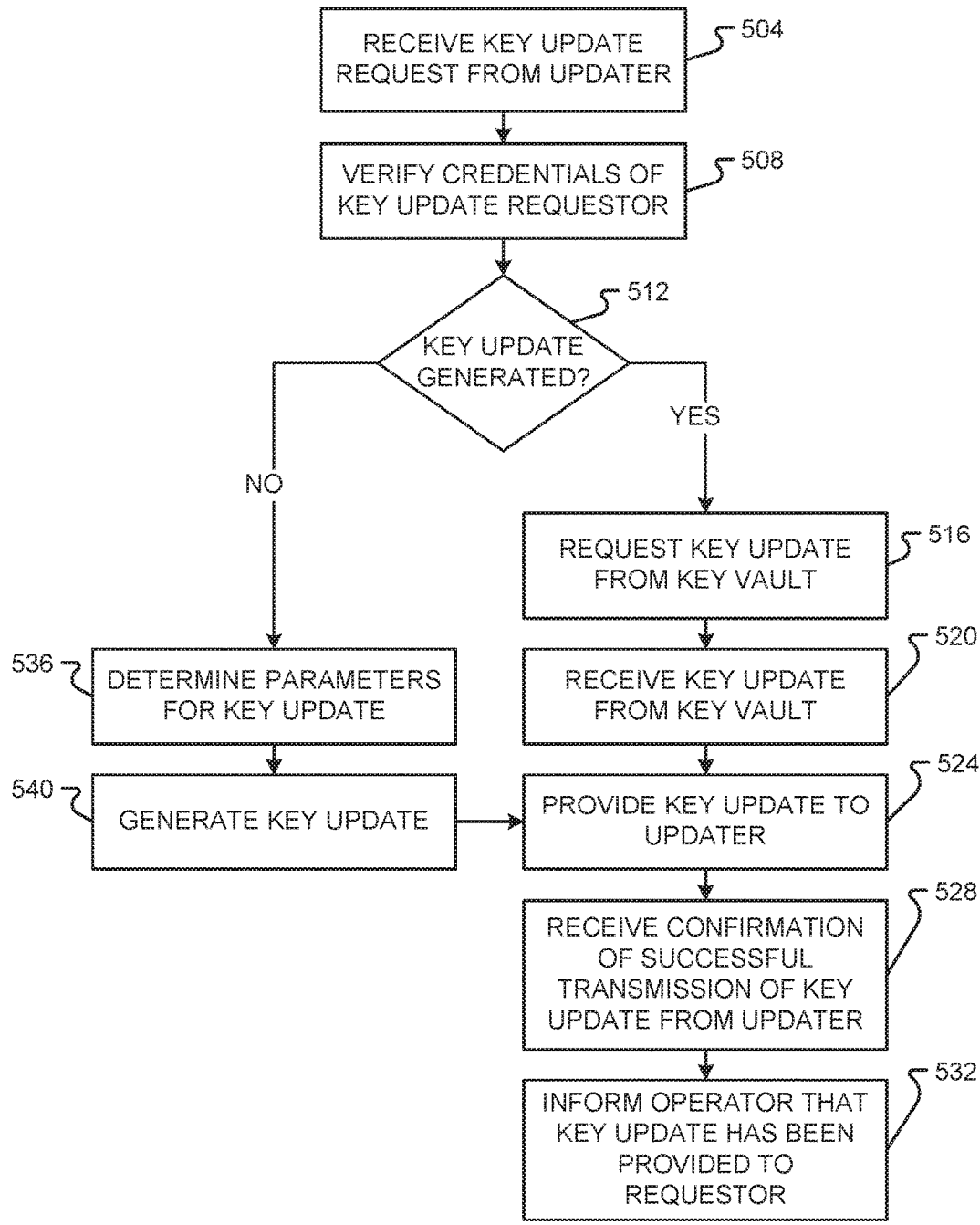
FIG. 5 is a flow diagram of a method according to an embodiment of the present disclosure.

FIG. 5 provides a flow diagram of a method carried out by a key issuance backend 120—and more particularly, a key issuance device 302—according to some embodiments of the present disclosure. The method begins when the key issuance device 302 receives from an updater 108 a key update request corresponding to a mobile device 112 (step 504). The key update request arrives via a communications network 104 over the network interface 330 of the key issuance device 302. Particularly where a mobile access application 152 prepares the key update request, the key update request may include information required by the key issuance device 302 to verify the credentials of the key update requestor (step 508). Even if such details are not provided with the initial key update request, however, the key issuance device 302 may request them from the mobile device 112 through the updater 108.

Once the key issuance device 302 determines that the mobile device 112 is authentic and authorized to receive a mobile key or other key update, the key issuance device 302 determines whether the requested key update has already been generated (step 512). This is most likely to have occurred in situations where the need for a mobile key or other key update was identified several hours or more in advance of the key issuance device 302 receiving the key update request. For example, when a hotel has received an advance room reservation from a guest, the key issuance device 302 may have generated the mobile key or keys corresponding to the reservation shortly after the reservation was received (or during an intervening slow period when the key issuance device 302 is not otherwise being used, or is not otherwise being used to maximum capacity), and then sent the mobile key(s) to the key vault 334, via communication interface 326 of the key issuance device 302 and communication interface 338 of the key vault 334, for storage in the secure data storage 350 thereof. If the key update has already been generated, then the key issuance device 302 sends a request to the key vault 334 for the key update to be retrieved from the secure data storage 350 and sent back to the key issuance device 302 (step 516). In embodiments, the key update may be stored in the memory 140 of the key issuance device 302 or in the memory 346 of the key vault 334. In these embodiments, the key issuance device 302 locates the key update and, if necessary (e.g. if the key update is stored in the key vault 334), sends a request for the key update.

After requesting a key update from the key vault 334, the key issuance device 302 receives the key update from the key vault 334 and transmits the key update to the updater 108 via the network interface 330 and the communication network 104 (step 528). Alternatively, if in step 512 the key issuance device 302 determines that a requested key update has not already been generated, then the key issuance device 302 determines any applicable parameters for the key update (e.g. guest name, assigned room, length of stay, status level, etc.) (step 536) and generates the key update (step 540). The key issuance device 302 then provides the key update to the updater, just as it does when the key update has been previously generated and is retrieved from the key vault (step 524).

Once the key update has been sent to the updater 108, the key issuance device 302 may, in some embodiments, receive a message from the updater 108 confirming that the key update was successfully transmitted to the mobile device 112. The key issuance device 302 can then send a message to an operator (whether via user interface 322 or via network interface 330 and communication network 104, e.g. to remote user interface 354) indicating that the key update has been provided to the key update requestor. This information can be used by the operator, for example, to determine whether a hotel guest has arrived at the hotel.

Figure 6:
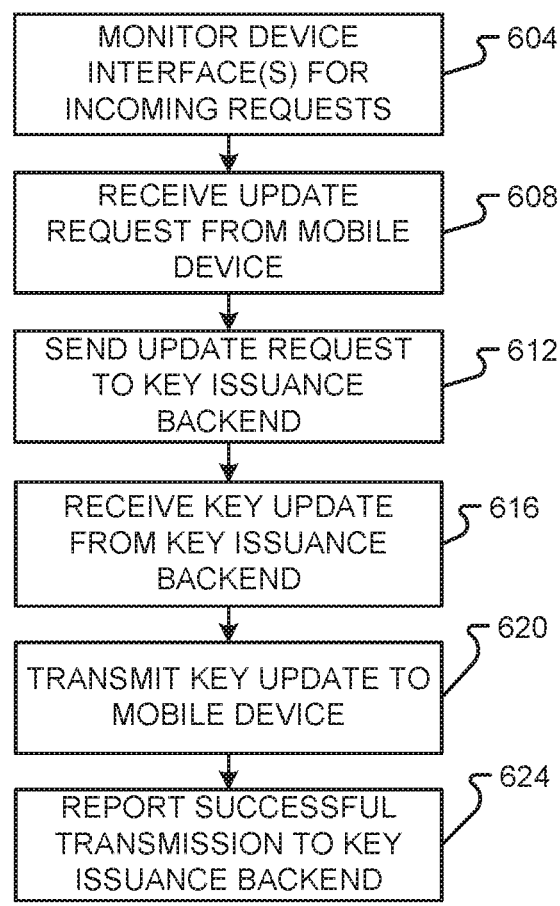
FIG. 6 is a flow diagram of a method according to an embodiment of the present disclosure.

In accordance with some embodiments of the present disclosure, an updater 108 may utilize or follow the method shown in the flow diagram of FIG. 6. This method begins with the monitoring of each device interface 232 for incoming key update requests (step 604). When the updater 108 receives a key update request from a mobile device 112 (step 608), the updater 108 sends the key update request to the key issuance backend 120 via the communication 104. (The key issuance backend 120 may include, for example, a key issuance device 302 and a key vault 334.) The updater 108 then receives the appropriate key update from the key issuance backend 120 (step 616), which it transmits to the requesting mobile device 112 via the device interface 232 and communication channel 116 over which it received the key update request from the mobile device 112 (step 620). In embodiments, the updater 108 sends a message to the key issuance backend 120 reporting the successful transmission to the mobile device 112 of the key update.

In embodiments of the present disclosure, the updater 108 may receive in step 616 an error message instead of the requested key update from the key issuance backend 120. The error message may simply indicate that an error has occurred, thus ending the key update process. Alternatively, the error message may indicate, for example, that the mobile device 112 that initiated the key update request could not be authenticated, or is not authorized to receive a mobile key. The error message may also indicate, for example, that the mobile device 112 has been presented to the updater 108 too early, e.g. before the proper check-in time. The message may be for display to the user by the updater 108 (in embodiments where the updater 108 has a screen or other graphical user interface) in a readable format (e.g. text), or the message may be for transmission to the mobile device 112 together with the key update for display to the user (in a readable format) on the user's mobile device 112. In some embodiments, instead of or in addition to displaying the error message to the user in a readable format, the error message may trigger the display of a code to the user, and/or the transmission of a code or of a readable error message to an operator 124. In embodiments, an error message or code may be communicated to a user or to an operator 124 by a particular sequence of light flashes (e.g. using an LED or other light) or audio signals (e.g. using a speaker), or otherwise.

In still other embodiments, the updater 108 may receive in Step 616, in addition to the requested key update, a message to be displayed to the user of the mobile device 112. The message may be an error message as described above, or the message may contain useful information associated with the key update, such as the room number(s) for which the included mobile key will work, the time and date at which the key will be activated, the time and date at which the key will be deactivated, the changes that were made to the privileges of an existing key, and so forth.

Although much of the foregoing disclosure described embodiments used in a multi-room facility, other embodiments of the present disclosure may be used wherever mobile keys need to be distributed. Further, mobile keys as discussed herein are not limited to mobile keys that protect physical assets, but also encompass mobile keys that protect electronic, logical, or other assets.

As can be seen from the above description, the system and methods disclosed herein are useful for protecting sensitive information stored in a mobile device by allowing transmission of such information only when one or more requirements are satisfied. Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Moreover, where methods are described, the depicted steps or a subset thereof may be performed in various orders or in parallel without departing from the scope of the present disclosure. Additionally, various combinations of the features and functions described herein, even if such combinations are not explicitly described, may be utilized without departing from the scope of the present disclosure.

What is claimed is:

1. A method for delivering an access control key to a mobile device, comprising:
   determining that a mobile device is not in communication via a primary network connection with a key issuance backend, the mobile device being a portable device associated with a user authorized to receive the access control key, and the mobile device comprising a network interface that is at least one of: limited in functionality, disabled, or otherwise prevented from directly transmitting requests to the key issuance backend;
   establishing, based on the determining, a proximity-based communication channel between the mobile device and an update reader as an alternative update channel to the primary network connection;
   receiving an update request at the update reader from the mobile device, wherein the update request is communicated via the proximity-based communication channel;
   providing the update request to the key issuance backend on behalf of the mobile device, wherein the update request is provided to the key issuance backend by the update reader having a network interface that enables communications with the key issuance backend;
   receiving, at the update reader, the access control key from the key issuance backend in response to the update request, wherein the access control key is configured to be provided to an access control reader, different than the update reader, and authorizing access by the user to a physical asset protected by the access control reader; and
   transmitting the access control key from the update reader to the mobile device via the proximity-based communication channel such that the access control key is stored in a memory of the mobile device for later presentation by the mobile device to the access control reader to obtain the access.

2. The method of claim 1, wherein the proximity-based communication channel comprises at least one of a BLE, peer-to-peer WiFi, and NFC communication channel.

3. The method of claim 1, wherein the update request includes at least one identifier of the mobile device.

4. The method of claim 1, further comprising notifying an operator that the access control key has been received at the mobile device via the proximity-based communication channel.

5. The method of claim 1, wherein the access control key corresponds to a key pre-issued by an operator or generated in response to check-in in response to the user of the mobile device remotely checking-in at a multiroom facility.

6. An update reader device, comprising:
   a network interface that facilitates communications with a key issuance backend via a communication network;
   a device interface that facilitates establishment of a proximity-based communication channel with a mobile device in response to the mobile device being brought within a predetermined distance of the update reader device and in response to a determination that the mobile device is not in communication via a primary network connection with the key issuance backend, wherein the proximity-based communication channel is established as an alternative update channel to the primary network connection, the mobile device being a portable device associated with a user authorized to receive or carry a key issued by the key issuance backend, and the mobile device comprising a network interface that is at least one of: limited in functionality, disabled, or otherwise prevented from directly transmitting requests to the key issuance backend;
   a processor; and
   memory including instructions that, when executed by the processor, enable the update reader device to transmit an update request to the key issuance backend on behalf of the mobile device and then provide the key or an update corresponding to the key to the mobile device via the proximity-based communication channel, wherein the key is configured for storage by the mobile device and then presentation by the mobile device to an access control reader, different than the update reader device, authorizing access by the user to a physical asset protected by the access control reader.

7. The update reader device of claim 6, wherein the key is received at the update reader device from the key issuance backend via the network interface of the update reader device.

8. The update reader device of claim 6, wherein the network interface of the update reader device facilitates TCP/IP communications.

9. The update reader device of claim 6, wherein the proximity-based communication channel comprises at least one of a BLE, peer-to-peer WiFi, and NFC channel.

10. The update reader device of claim 6, wherein the key is encrypted when received at the network interface of the update reader device, encrypted when stored by the mobile device, and never exposed unencrypted by the update reader device.

11. The update reader device of claim 6, wherein communication via the communication network is limited to approved key issuing backends or postboxes so that the update reader device cannot be utilized for general Internet connectivity.

12. The update reader device of claim 6, wherein the device interface is one of a plurality of device interfaces, each of the plurality of device interfaces being configured to establish a proximity-based communication channel based on a communication protocol not used by the other plurality of device interfaces.

13. A physical access control system, comprising:
one or more access control readers that protect one or more respective physical assets; and
an update reader device, different than the one or more access control readers, the update reader device comprising:
a network interface that facilitates communications with a key issuance backend via a communication network;
a device interface that facilitates establishment of a proximity-based communication channel with a mobile device in response to the mobile device being brought within a predetermined distance of the update reader and in response to a determination that the mobile device is not in communication via a primary network connection with the key issuance backend, wherein the proximity-based communication channel is established as an alternative update channel to the primary network connection, the mobile device being a portable device associated with a user authorized to receive or carry a key issued by the key issuance backend, and the mobile device comprising a network interface that is at least one of: limited in functionality, disabled, or otherwise prevented from directly transmitting requests to the key issuance backend;
a processor; and
memory including instructions that, when executed by the processor, enable the update reader device to transmit an update request to the key issuance backend on behalf of the mobile device and then provide a key or an update corresponding to the key to the mobile device via the proximity-based communication channel, wherein the key is configured for storage by the mobile device and then later presentation by the mobile device to at least one of the one or more access control readers, authorizing access by the user to one or more physical assets protected by the at least one of the one or more access control readers.

14. The physical access control system of claim 13, wherein the key is received at the update reader device from the key issuance backend via the network interface of the update reader device.

15. The physical access control system of claim 13, wherein the network interface of the update reader device facilitates TCP/IP communications.

16. The physical access control system of claim 13, wherein the proximity-based communication channel comprises at least one of a BLE, peer-to-peer WiFi, and NFC channel.

17. The physical access control system of claim 13, wherein the key is encrypted when received at the network interface of the update reader device, encrypted when stored by the mobile device, and never exposed unencrypted by the update reader device.

18. The physical access control system of claim 13, wherein communication via the communication network is limited to approved key issuing backends or postboxes so that the update reader device cannot be utilized for general Internet connectivity.

19. The physical access control system of claim 13, wherein the device interface is one of a plurality of device interfaces, each of the plurality of device interfaces being configured to establish a proximity-based communication channel based on a communication protocol not used by the other plurality of device interfaces.

* * * * *